(12) United States Patent
Kim

(10) Patent No.: US 9,533,541 B2
(45) Date of Patent: Jan. 3, 2017

(54) ACTIVE SUSPENSION APPARATUS FOR VEHICLE AND VALVE THEREOF

(71) Applicant: MANDO CORPORATION, Gyeonggi-do (KR)

(72) Inventor: Tae Ju Kim, Yongin-si (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 14/887,011

(22) Filed: Oct. 19, 2015

(65) Prior Publication Data

US 2016/0114645 A1 Apr. 28, 2016

(30) Foreign Application Priority Data

Oct. 22, 2014 (KR) .................. 10-2014-0143620

(51) Int. Cl.

| | | |
|---|---|---|
| *B60G 17/027* | (2006.01) | |
| *B60G 17/033* | (2006.01) | |
| *B60G 17/056* | (2006.01) | |
| *B60G 17/04* | (2006.01) | |
| *F16H 25/22* | (2006.01) | |

(Continued)

(52) U.S. Cl.
CPC .......... *B60G 17/056* (2013.01); *B60G 17/021* (2013.01); *B60G 17/027* (2013.01); *B60G 17/0272* (2013.01); *B60G 17/033* (2013.01); *B60G 17/0408* (2013.01); *F16H 25/2204* (2013.01); *F16K 31/0665* (2013.01); *B60G 2202/413* (2013.01); *B60G 2202/416* (2013.01); *B60G 2204/8102* (2013.01); *B60G 2500/11* (2013.01);

(Continued)

(58) Field of Classification Search
CPC . B60G 17/021; B60G 17/0272; B60G 17/033; B60G 21/073; B60G 2202/413; B60G 2600/182; B60G 2204/8102; F16H 25/2204; F04B 1/02; F04B 1/124
USPC .............................. 280/5.505, 5.5, 124.161, 124.16,280/124.162; 701/37; 417/534
See application file for complete search history.

(56) References Cited

U.S. PATENT DOCUMENTS 3,921,746 A    11/1975 Lewus
5,015,009 A *  5/1991 Ohyama ............ B60G 17/0162
                                                    280/5.51

(Continued)

FOREIGN PATENT DOCUMENTS

| DE | 10 2011 100 307 | 11/2012 |
|---|---|---|
| DE | 10 2015 007 481 | 12/2015 |
| WO | 2014/153730 | 10/2014 |

OTHER PUBLICATIONS

Office Action dated Jan. 25, 2016 for German Patent Application No. 10 2015 013 609.7.

*Primary Examiner* — Keith Frisby
(74) *Attorney, Agent, or Firm* — Ladas & Parry, LLP

(57) ABSTRACT

An active suspension apparatus for a vehicle according to one embodiment of the present invention includes a pump configured to control movement of a fluid, an actuator connected with a coil spring, which is connected with a wheel of the vehicle, and configured to receive the fluid from the pump and to compensate for a displacement of the coil spring, a fluid path configured to connect the pump with the actuator, and a valve configured to control a flow of the fluid in the fluid path, wherein, when the actuator is controlled to receive the fluid from the pump, the valve is configured to prevent the fluid from flowing from the actuator to the pump by a pressure of the fluid accommodated in the actuator.

18 Claims, 6 Drawing Sheets

(51) Int. Cl.
*B60G 17/02* (2006.01)
*F16K 31/06* (2006.01)

(52) U.S. Cl.
CPC .... *B60G 2600/182* (2013.01); *Y10T 74/18656* (2015.01)

(56) References Cited

U.S. PATENT DOCUMENTS

| | | | |
|---|---|---|---|
| 6,000,702 A | 12/1999 | Streiter | |
| 6,240,348 B1* | 5/2001 | Shono | B60G 17/017 280/124.159 |
| 2014/0260233 A1* | 9/2014 | Giovanardi | F15B 13/0444 60/431 |

* cited by examiner

ACTIVE SUSPENSION APPARATUS FOR VEHICLE AND VALVE THEREOF

CROSS-REFERENCE TO RELATED APPLICATION

This application claims priority to and the benefit of Korean Patent Application No. 10-2014-0143620, filed on Oct. 22, 2014, the disclosure of which is incorporated herein by reference in its entirety.

BACKGROUND

1. Field of the Invention

The present invention relates to an active suspension apparatus for a vehicle and a pump applied thereto, and more particularly, to an active suspension apparatus for a vehicle, which supplies a fluid to an actuator disposed at each wheel of the vehicle using a pump driven by a motor, and a valve thereof.

2. Discussion of Related Art

An active suspension system in a vehicle is a system which detects various inputs from a road surface through sensors, and effectively controls a roll behavior of the vehicle through an electric control unit (ECU) based on the detected inputs.

Specifically, the active suspension system is provided with an actuator which compensates for a displacement of a coil spring connected to a wheel of the vehicle, and constantly maintains a height of the vehicle by appropriately controlling an amount of a fluid supplied to the actuator and detecting a change of a roll and a pitch of the vehicle, and thus enhances ride comfort and a grip force on the road surface.

Furthermore, the active suspension system may allow a driver to set the height of the vehicle through a level control according to a state of the road surface, or may reduce air resistance by reducing the height of the vehicle at a high speed, and thus may enhance driving safety and fuel efficiency.

With regard to the active suspension system, U.S. Pat. No. 6,000,702 discloses a technique in which a spring and a lift-adjustable regulating unit are connected in series, and an amount of a fluid supplied to the lift-adjustable regulating unit is controlled by a proportional control valve.

In such a technique, there is a problem in that the high-priced proportional control valve and hydraulic pump should be used. Also, the hydraulic pump has a structure which is connected to an engine and is always driven, and thus while the engine is working, the pump is always driven to generate a high pressure source, and an excessive capacity which is not required in the system is generated, and fuel economy is lowered by a reduction of an engine output.

SUMMARY OF THE INVENTION

The present invention is directed to providing an active suspension apparatus which does not use a high-priced proportional control valve, and thus reduces a cost and simplifies a structure thereof.

Also, the present invention is directed to providing an active suspension apparatus which minimizes energy consumption by using a motor and a cylinder-based pump.

Also, the present invention is directed to providing an active suspension apparatus, which prevents a fluid accommodated in an actuator from backflowing from the actuator toward a pump.

However, problems to be solved by the present disclosure are not limited to the above-described problems. Although not described here, other problems to be solved by the present invention can be clearly understood by those skilled in the art from the following description.

According to an aspect of the present invention, there is provided an active suspension apparatus for a vehicle including a pump configured to control movement of a fluid, an actuator connected with a coil spring, which is connected with a wheel of the vehicle, and configured to receive the fluid from the pump and to compensate for a displacement of the coil spring, a fluid path configured to connect the pump with the actuator, and a valve configured to control a flow of the fluid in the fluid path, wherein, when the actuator is controlled to receive the fluid from the pump, the valve is configured to prevent the fluid from flowing from the actuator to the pump by a pressure of the fluid accommodated in the actuator.

The actuator may include first, second, third, and fourth actuators disposed at a left front wheel, a left rear wheel, a right front wheel, and a right rear wheel of the vehicle, respectively, and the pump may be capable of simultaneously supplying the fluid to the first and second actuators or the third and fourth actuators based on a driving of a motor.

The pump may include a first chamber and a second chamber formed by dividing an inside of a cylinder in a longitudinal direction of the cylinder; and a first piston and a second piston disposed at the first chamber and the second chamber, respectively, and the first piston and the second piston may be moved based on the driving of the motor, and thus the fluid accommodated in the first chamber and the second chamber may be supplied to the actuator.

The fluid path may include a first fluid path between the pump and the first actuator, a second fluid path between the pump and the second actuator, a third fluid path between the pump and the third actuator, and a fourth fluid path between the pump and the fourth actuator.

The first fluid path may include a 1-1 fluid path which is directly connected to the pump, a 1-2 fluid path of which one side is connected with the 1-1 fluid path and the other side is connected with the first actuator, and a 1-3 fluid path which is branched from a connection between the 1-1 fluid path and the 1-2 fluid path and connected with a reservoir, and the valve may be disposed at the 1-2 fluid path and the 1-3 fluid path.

The second fluid path may include a 2-1 fluid path which is directly connected to the pump, a 2-2 fluid path of which one side is connected with the 2-1 fluid path and the other side is connected with the second actuator, and a 2-3 fluid path which is branched from a connection between the 2-1 fluid path and the 2-2 fluid path and connected with a reservoir, and the valve may be disposed at the 2-2 fluid path and the 2-3 fluid path.

The third fluid path may include a 3-1 fluid path which is directly connected to the pump, a 3-2 fluid path of which one side is connected with the 3-1 fluid path and the other side is connected with the third actuator, and a 3-3 fluid path which is branched from a connection between the 3-1 fluid path and the 3-2 fluid path and connected with a reservoir, and the valve may be disposed at the 3-2 fluid path and the 3-3 fluid path.

The fourth fluid path may include a 4-1 fluid path which is directly connected to the pump, a 4-2 fluid path of which one side is connected with the 4-1 fluid path and the other side is connected with the fourth actuator, and a 4-3 fluid path which is branched from a connection between the 4-1 fluid path and the 4-2 fluid path and connected with a reservoir, and the valve may be disposed at the 4-2 fluid path and the 4-3 fluid path.

The valve may include a sleeve, an armature provided in the sleeve to be vertically movable, a sheet holder coupled with a lower end of the sleeve and having a first connection part formed at a lower side thereof to be connected with the fluid path disposed at a side of the pump and a second connection part formed at a side surface thereof to be connected with the fluid path disposed at a side of the actuator, and an opening and closing member accommodated in the sheet holder to be vertically movable based on movement of the armature, and when the opening and closing member is moved upward, the first connection part and the second connection part may be in fluid communication with each other.

The valve may further include a first elastic member which applies a force in a downward direction of the opening and closing member.

According to another aspect of the present invention, there is provided a valve which is included in the active suspension apparatus for the vehicle according to another embodiment, including a sleeve, an armature provided in the sleeve to be vertically movable, a sheet holder coupled with a lower end of the sleeve and having a first connection part formed at a lower side thereof to be connected with a fluid path disposed at a side of a pump and a second connection part formed at a side surface thereof to be connected with the fluid path disposed at a side of an actuator, and an opening and closing member accommodated in the sheet holder to be vertically movable based on movement of the armature, and when the opening and closing member is moved upward, the first connection part and the second connection part may be in fluid communication with each other.

The valve may further include a first elastic member which applies a force in a downward direction of the opening and closing member.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
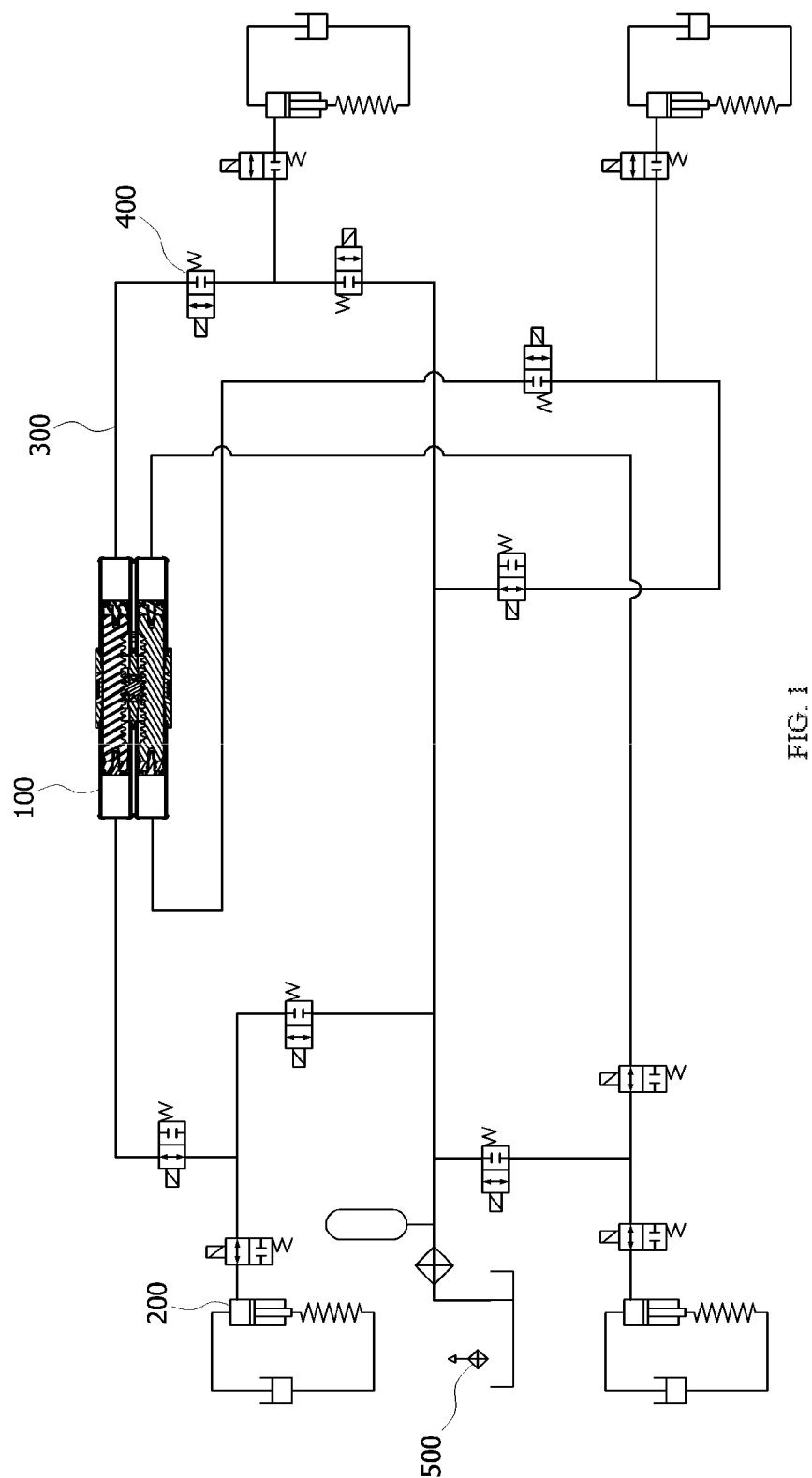
FIGS. 1 and 2 are circuit diagrams of an active suspension apparatus for a vehicle according to one embodiment of the present invention.

Exemplary embodiments of the present invention will be described in detail with reference to the accompanying drawings, wherein like reference numerals refer to like or corresponding elements throughout the drawings and repetitive descriptions thereof will be omitted.

Also, if it is considered that the specific description of the related and noticed functions or structures may obscure the essence of the present invention, the specific description thereof will be omitted. Also, the accompanying drawings are used to help easily understand the technical idea of the present invention and it should be understood that the idea of the present invention is not limited by the accompanying drawings.

Figure 2:
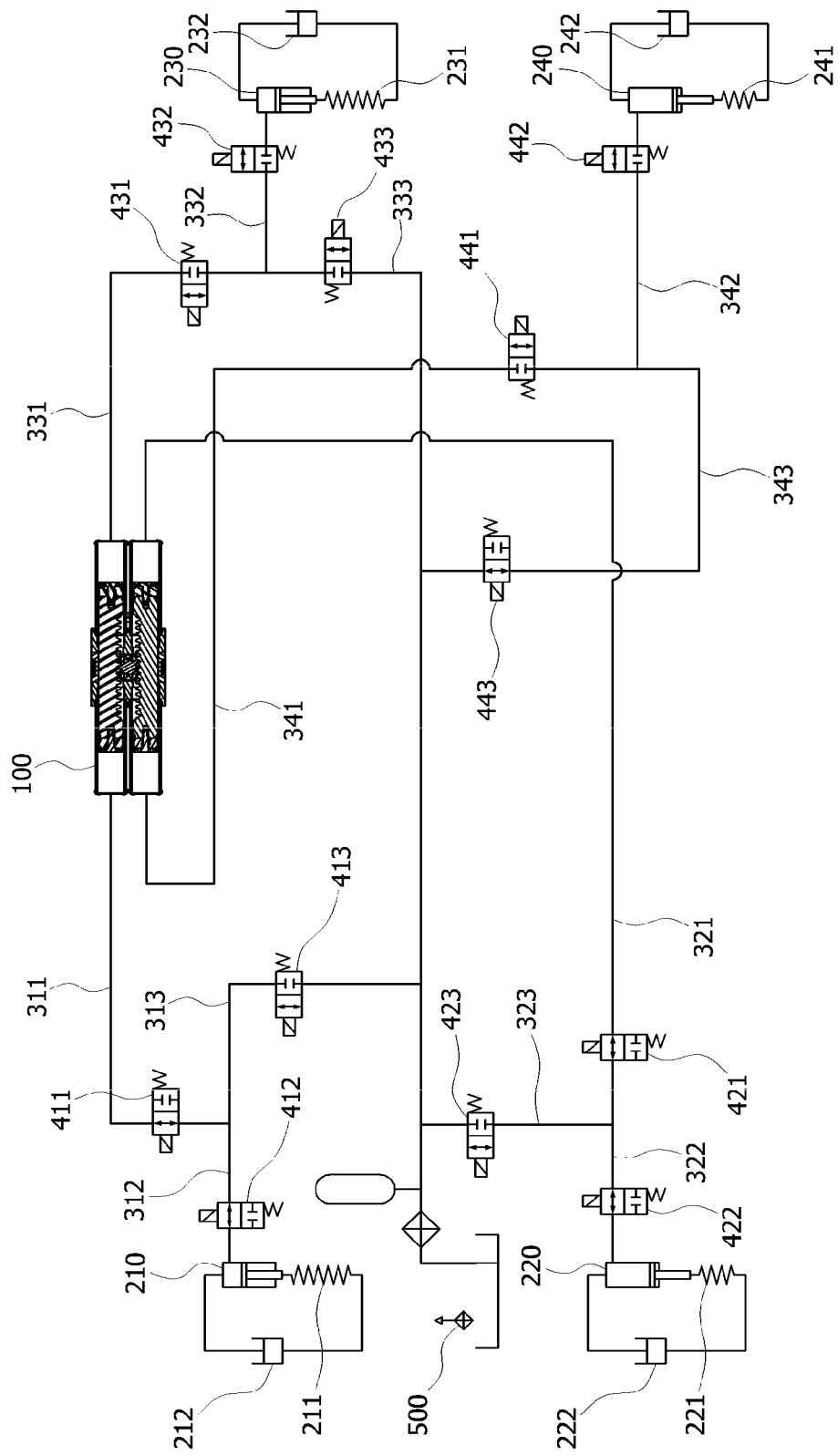

Hereinafter, an active suspension apparatus for a vehicle according to one embodiment of the present invention will be described with reference to FIGS. 1 and 2. FIGS. 1 and 2 are circuit diagrams of the active suspension apparatus for the vehicle according to one embodiment of the present invention.

As illustrated in FIGS. 1 and 2, the active suspension apparatus for the vehicle according to one embodiment of the present invention may include a pump 100, an actuator 200, a fluid path 300, a valve 400, and a reservoir 500.

The pump 100 is an element which generates a hydraulic pressure in a fluid used in the active suspension apparatus for the vehicle, and serves to control a movement of the fluid in the apparatus, and is specifically driven using a motor 110. In the related art, a pump of the active suspension apparatus for the vehicle is a hydraulic pump, and is connected to an engine to be always driven, and thus there is a problem in generating an unnecessary pressure. However, like the active suspension apparatus for the vehicle according to one embodiment of the present invention, when the pump 100 is driven by the motor 110, a signal is transmitted to the motor according to a necessity by an electric control unit (ECU), and the pump 100 may be selectively driven, and thus it is possible to enhance an engine output and fuel efficiency.

As illustrated in FIGS. 1 and 2, the actuator 200 receives the fluid from the pump 100, and may include first, second, third, and fourth actuators 210, 220, 230, and 240 which are disposed at a left front wheel, a left rear wheel, a right front wheel, and a right rear wheel of the vehicle, respectively. The actuators 210, 220, 230, and 240 may be connected with coil springs 211, 221, 231, and 241 and dampers 212, 222, 232, and 242, respectively. In particular, the actuators 210, 220, 230, and 240 serve to compensate for displacements of the coil springs 211, 221, 231, and 241.

Particularly, based on driving of the motor 110, the pump 100 may simultaneously supply the fluid to the first actuator 210 and the second actuator 220, or may simultaneously supply the fluid to the third actuator 230 and the fourth actuator 240. That is, by driving of one pump 100, the fluid may be simultaneously supplied to the actuators of the left front and left rear wheels of the vehicle, or simultaneously supplied to the actuators of the right front and right rear wheels of the vehicle.

The fluid path 300 is a path for movement of the fluid between the pump 100 and the actuator 200 or the reservoir 500, and, as illustrated in FIG. 2, the fluid path formed between the pump 100 and the first actuator 210 includes a 1-1 fluid path 311 which is directly connected to the pump 100, a 1-2 fluid path 312 which is branched from the 1-1 fluid path 311, and a 1-3 fluid path 313. The 1-2 fluid path 312 is a path which is connected with the first actuator 210, and the 1-3 fluid path 313 is a path which is connected with the reservoir 500. Like the path formed between the pump 100 and the first actuator 210, paths formed between the pump 100 and the second actuator 220, the third actuator 230, and the fourth actuator 240 may be subdivided as illustrated in FIG. 2, and descriptions thereof will be omitted.

The valve 400 is disposed at the fluid path 300 and serves to control a flow of the fluid. In particular, in the active suspension apparatus for the vehicle according to one embodiment of the present invention, an on/off valve is used, instead of a proportional control valve, and the movement of the fluid may be selectively controlled by controlling an operation of the on/off valve through the ECU. Through this, a structure of the system may be simplified, and also a cost thereof may be reduced.

Meanwhile, the reservoir 500 serves to accommodate and store the fluid, when a flow rate of the fluid in the active suspension apparatus for the vehicle according to one embodiment of the present invention is excessive, and also serves to supply the fluid to each of the actuators 200 or the pump 100 when the actuators 200 need more supply of the fluid.

Figure 3:
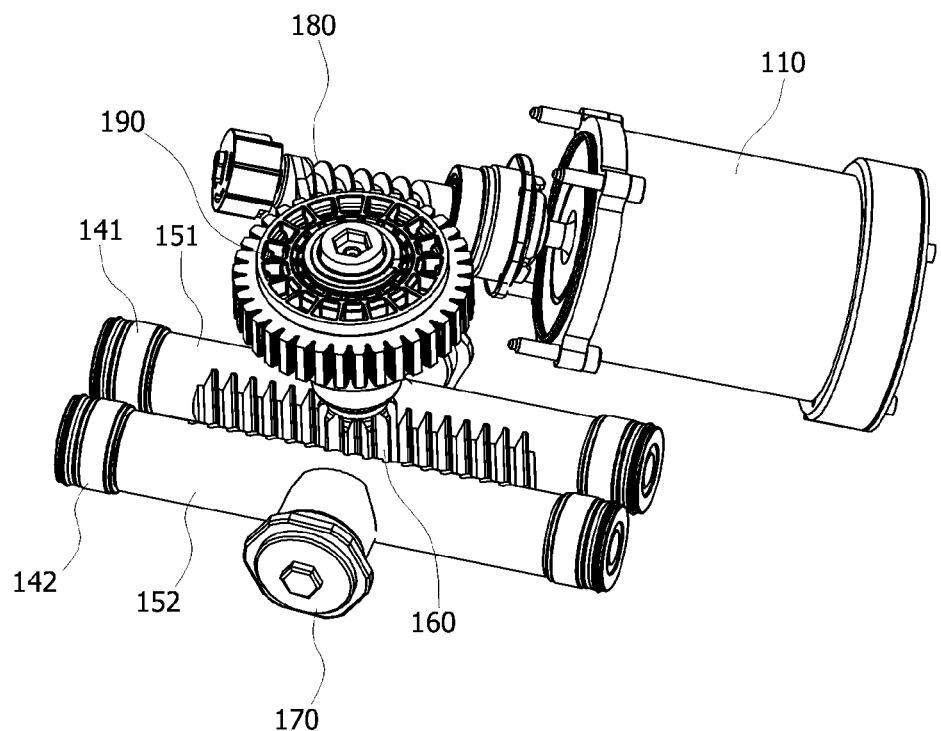
FIG. 3 is an assembling view of internal elements illustrating a coupling between elements of a pump in the active suspension apparatus for the vehicle according to one embodiment of the present invention.

Hereinafter, the active suspension apparatus for the vehicle according to one embodiment of the present invention will be described in detail with reference to FIGS. 3 and 4. FIG. 3 is an assembling view of internal elements illustrating a coupling between elements of the pump in the active suspension apparatus for the vehicle according to one embodiment of the present invention, and FIG. 4 is a cross-sectional view illustrating an internal structure of the pump in the active suspension apparatus for the vehicle according to one embodiment of the present invention.

Figure 4:
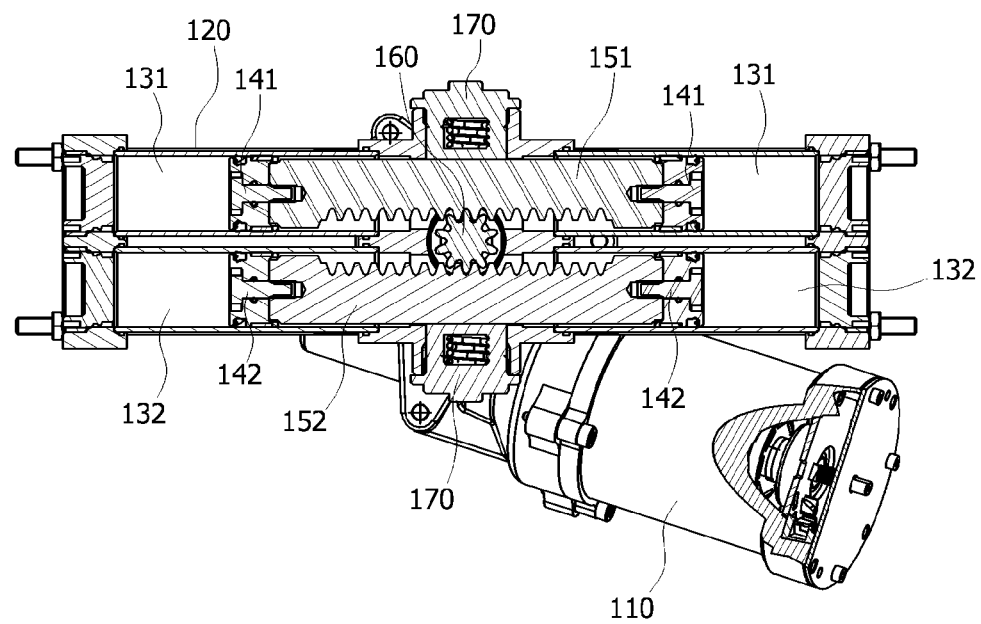
FIG. 4 is a cross-sectional view illustrating an internal structure of the pump in the active suspension apparatus for the vehicle according to one embodiment of the present invention.

As illustrated in FIGS. 3 and 4, the pump 100 in the active suspension apparatus for the vehicle according to one embodiment of the present invention includes elements such as a first piston 141, a second piston 142, a first rack bar 151, a second rack bar 152, and a pinion 160.

In the pump 100 of the active suspension apparatus for the vehicle according to one embodiment of the present invention, a cylinder 120 is formed, and an inside of the cylinder 120 is divided in a longitudinal direction of the cylinder 120 and forms a first chamber 131 and a second chamber 132. The first piston 141 and the second piston 142 are disposed in the first chamber 131 and the second chamber 132, respectively. The first piston 141 and the second piston 142 are moved, i.e., reciprocate through the driving of the motor 110, and thus the fluid accommodated in the first chamber 131 and the second chamber 132 is supplied to the actuator 200. Meanwhile, the motor 110 may be integrally formed and disposed with the pump 100, or may be separately disposed.

In a more detailed description of the operation of the pump 100 in the active suspension apparatus for the vehicle according to one embodiment of the present invention, tooth-shaped grooves are formed at one side of the first rack bar 151 and the second rack bar 152 and support the first piston 141 and the second piston 142, and the pinion 160 is disposed to be engaged with the grooves formed at one side of the first rack bar 151 and the second rack bar 152. The pinion 160 is connected with the motor 110, and when the pinion 160 is rotated by the motor 110, the first rack bar 151 and the second rack bar 152 are moved in opposite directions to each other. In conclusion, the first piston 141 and the second piston 142 are moved in opposite directions to each other by movements of the first rack bar 151 and the second rack bar 152. Due to the above dual cylinder pump structure, the fluid may be simultaneously supplied to a plurality of actuators 200 with one pump 100. In general, to control the plurality of actuators with one pump, it is necessary to increase a capacity of the pump, but there is a limitation in increasing the capacity of the pump due to a limitation of an output of the motor. However, in the case of the pump 100 having the dual cylinder structure applied to the active suspension apparatus for the vehicle according to one embodiment of the present invention, there is an advantage in that it is possible to control the plurality of actuators 200 without an increase in the output of the motor.

In particular, the pump 100 of the active suspension apparatus for the vehicle according to one embodiment of the present invention may further include a decelerating unit which transmits power of the motor 110 to the pinion 160. Specifically, as illustrated in FIG. 3, a worm gear 180 and a worm wheel 190 are provided as the decelerating unit. When the motor 110 rotates the worm gear 180, the worm wheel 190 disposed to be engaged with the worm gear 180 is rotated, and thus the pinion 160 may be rotated. Accordingly, a deceleration ratio may be increased, and thus a load of the motor 110 may be reduced, and efficiency of the motor may be increased.

Meanwhile, the pump 100 of the active suspension apparatus for the vehicle according to one embodiment of the present invention may further include a support yoke 170 which supports at least one of the first rack bar 151 and the second rack bar 152. The support yoke 170 is an element which is used to prevent a gap from forming between the first rack bar 151 or the second rack bar 152 and the pinion 160. Therefore, a malfunction due to the grooves formed at the first rack bar 151 or the second rack bar 152 or wear of the pinion 160 to a shape corresponding to the grooves is prevented, and also a rattling noise due to generation of a gap may be prevented.

Figure 5:
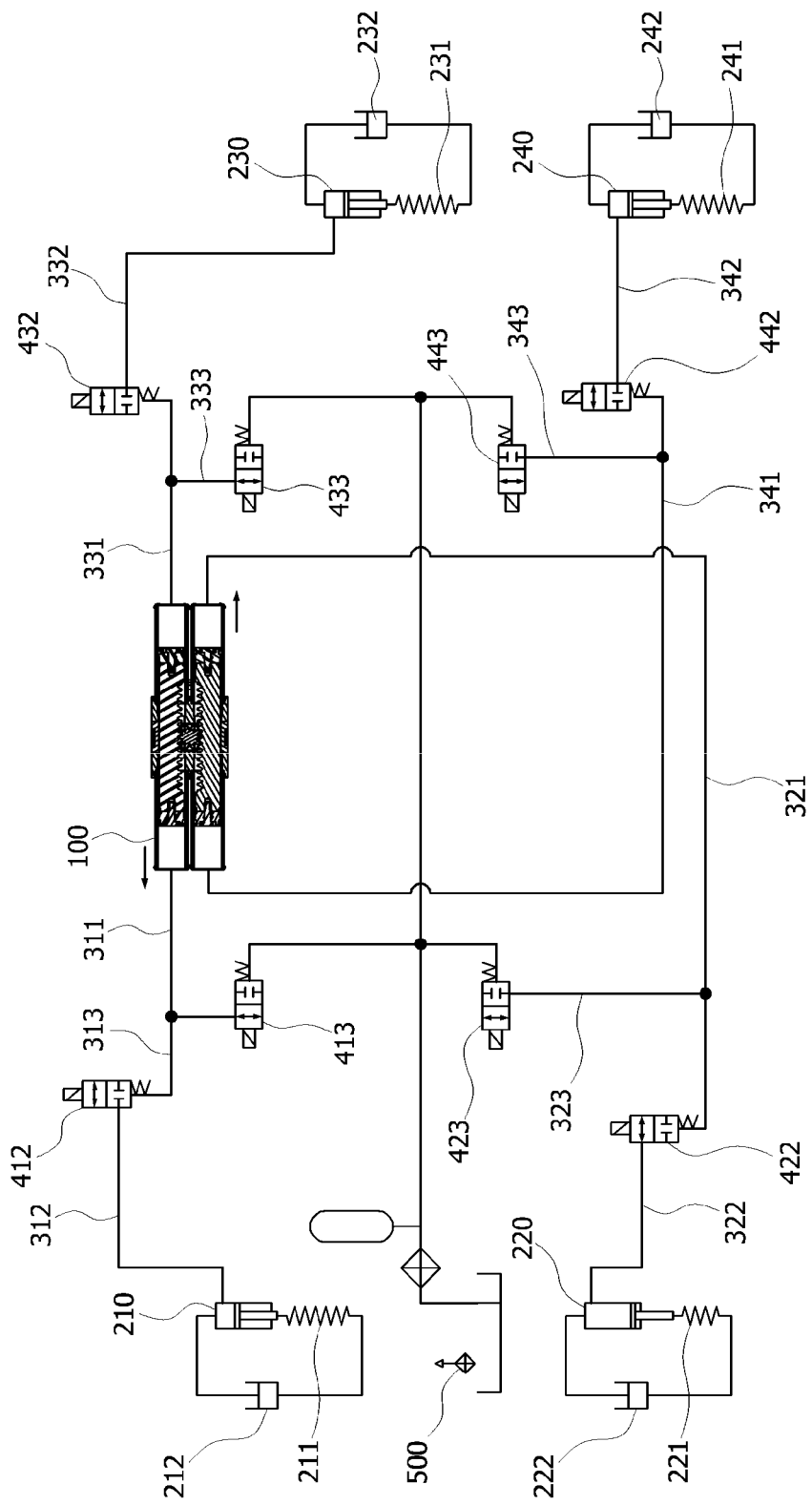
FIG. 5 is a circuit diagram illustrating another structure of the active suspension apparatus for the vehicle according to one embodiment of the present invention.

Another structure of the active suspension apparatus for the vehicle according to one embodiment of the present invention and a valve for the vehicle active suspension apparatus according to another embodiment of the present invention will be described with reference to FIGS. 5 to 7. FIG. 5 is a circuit diagram illustrating another structure of the active suspension apparatus for the vehicle according to one embodiment of the present invention, FIG. 6 is a cross-sectional view of a valve for the vehicle active suspension apparatus according to another embodiment of the present invention, and FIG. 7 is a cross-sectional view illustrating a flow of a fluid when the valve for the vehicle active suspension apparatus according to another embodiment of the present invention is opened.

Prior to description of another structure of the active suspension apparatus for the vehicle according to one embodiment of the present invention it is necessary to inspect a problem in the active suspension apparatus for the vehicle illustrated in FIGS. 1 and 2. As described above, by using the on/off valve 400 at the fluid path 300, the system structure may be simplified and the cost thereof may be reduced. However, when back pressure increases into the actuator 200, there is a problem in that the fluid may backflow from the actuator 200 toward the pump 100 due to a structure of the on/off valve 400. To solve the backflow problem, a separate on/off valve 400 for preventing the backflow should be provided. Eventually, as illustrated in FIGS. 1 and 2, since three on/off valves (a 1-1 valve 411, a 1-2 valve 412 and a 1-3 valve 413 in the case of the actuator 210 of the left front wheel) are installed at the fluid path which are connected to the pump 100 and the actuator 200 of each wheel, a total of 12 valves should be disposed at the entire system. Therefore, due to an increase in the number of the valves in an active suspension system, there are some problems in that a manufacturing cost is increased, a weight of the entire system is also increased, and a control logic for controlling many valves is complicated.

In a case of another structure of the active suspension apparatus for the vehicle according to one embodiment of the present invention, to solve the problems, the valve 400 is configured to prevent the fluid from backflowing from the actuator 200 toward the pump 100 due to a pressure of the fluid accommodated in the actuator 200. The valve for the vehicle active suspension apparatus according to another embodiment of the present invention will be described below with reference to FIGS. 6 and 7.

Figure 6:
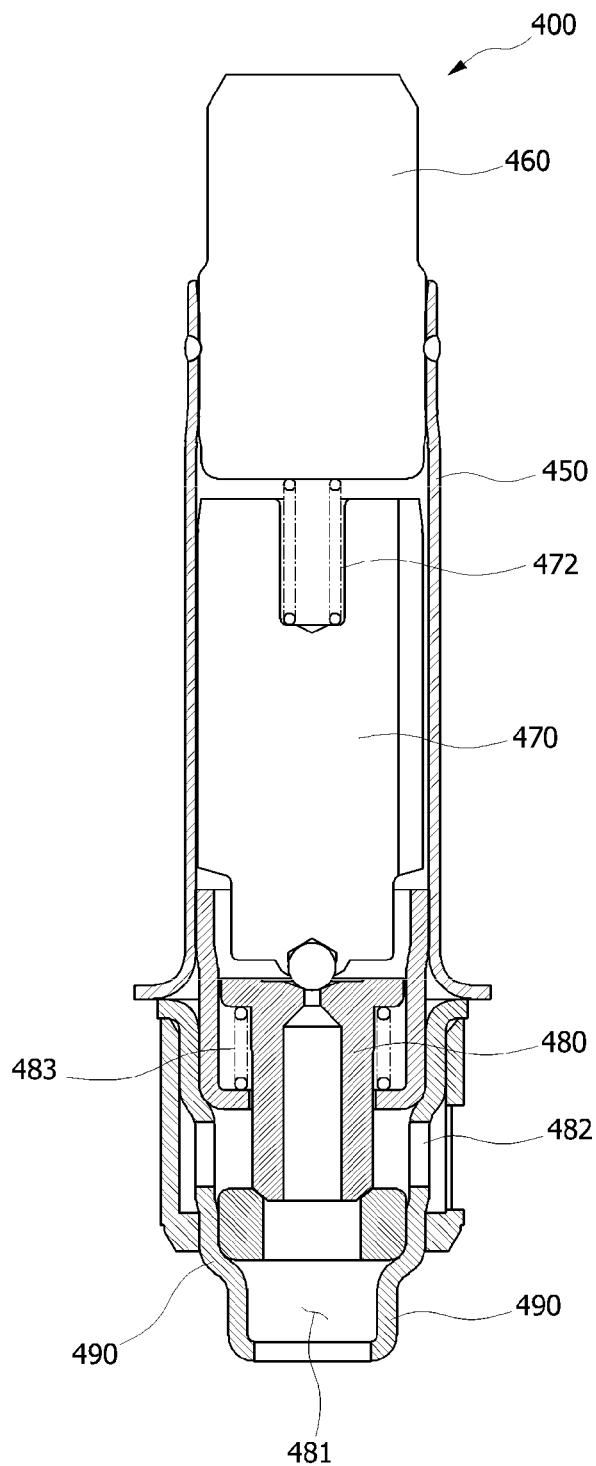
FIG. 6 is a cross-sectional view of a valve for the vehicle active suspension apparatus according to another embodiment of the present invention.
Figure 7:
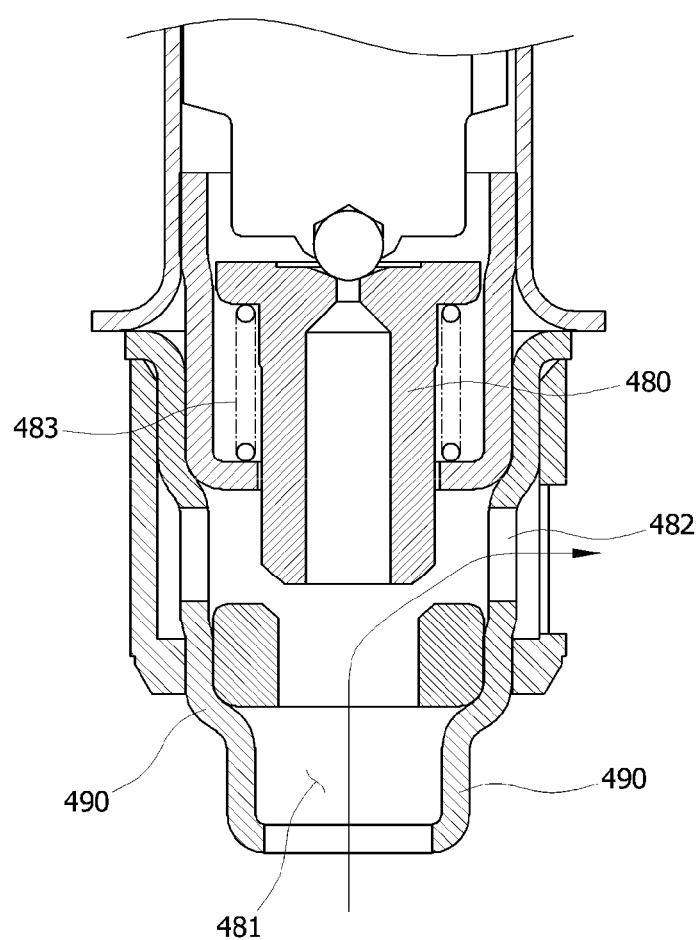
FIG. 7 is a cross-sectional view illustrating a flow of a fluid when the valve for the vehicle active suspension apparatus according to another embodiment of the present invention is opened.

As illustrated in FIG. 6, the valve 400 for the vehicle active suspension apparatus according to another embodiment of the present invention includes a sleeve 450, a valve core 460, an armature 470, an opening and closing member 480, a sheet holder 490, and so on. The sleeve 450 has a cylindrical shape of which upper and lower portions are opened, and the valve core 460 is fitted into an upper end of the sleeve 450 to seal the opened upper portion of the sleeve 450. The armature 470 is disposed at an inside of the sleeve 450 to be vertically movable, and has a cylindrical shape of which an outer diameter corresponds to an inner diameter of the sleeve 450. Specifically, when power is applied to an excitation coil assembly, the armature 470 may be moved toward the valve core 460 against an elastic force of a second elastic member 472 by a magnetic force acting between the valve core 460 and the armature 470. The sheet holder 490 is coupled to a lower end of the sleeve 450. A first connection part 481 which is connected with the fluid path located at a side of the pump 100 is formed at a lower side of the sheet holder 490, and a second connection part 482 which is connected with the fluid path located at a side of the actuator 200 is formed at a side surface thereof. The opening and closing member 480 is accommodated in the sheet holder 490, and configured to be vertically movable in the sheet holder 490 based on movement of the armature 470. A first elastic member 483 serves to apply a force in a downward direction of the opening and closing member 480 and thus to close the first connection part 481, when a separate power is not applied to the valve 400.

Hereinafter, an operation of the valve 400 of the active suspension apparatus for the vehicle according to another embodiment of the present invention will be described with reference to FIGS. 6 and 7. The valve 400 of the active suspension apparatus for the vehicle according to another embodiment of the present invention is a valve which is operated when the power is applied, i.e., a normally closed (N/C) valve which blocks the flow of the fluid in an unpowered state. That is, when the power is not applied to the excitation coil assembly, the opening and closing member 480 is in close contact with the lower side of the sheet holder 490 by an elastic force of the first elastic member 483, and thus closes the first connection part 481, as illustrated in FIG. 6. Conversely, when the power is applied to the excitation coil assembly, the armature 470 is moved upward in the sleeve 450, and the opening and closing member 480 is moved upward based on the movement of the armature 470. At this time, a force which is moving in an upward direction by the application of the power should be greater than the elastic force of the first elastic member 483. Due to such an operation, the opening and closing member 480 is located to be spaced apart from the lower side of the sheet holder 490, as illustrated in FIG. 7, and thus the first connection part 481 and the second connection part 482 are in fluid communication with each other.

Meanwhile, a pressure direction of the fluid introduced into the first connection part 481 is opposite to a direction to which the elastic force of the first elastic member 483 is applied, and thus when the pressure of the fluid introduced into the first connection part 481 is greater than the elastic force of the first elastic member 483, the opening and closing member 480 is moved upward, even though the power is not applied separately. Accordingly, the valve 400 is opened. When the first connection part 481 is connected with the fluid path located at the side of the actuator 200, there is a problem in that, when a pressure at the side of the actuator 200 is higher than that at the side of the pump 100, the fluid may backflow from the side of the actuator 200 to the side of the pump 100. Therefore, the present invention is configured so that the first connection part 481 is connected with the fluid path at the side of the pump 100 and the second connection part 482 is connected with the fluid path at the side of the actuator 200. Since the second connection part 482 is formed at the side surface of the sheet holder 490, and the pressure direction of the fluid introduced through the second connection part 482 is perpendicular to the direction to which the elastic force of the first elastic member 483 is applied, the opening and closing member 480 is not moved, even though the pressure of the fluid introduced from the fluid path at the side of actuator 200 is high, and thus the valve 400 remains maintained in a closed state. Due to the above-described structure of the valve for the vehicle active suspension apparatus according to another embodiment of the present invention, the fluid does not backflow, even when the pressure at the side of the actuator 200 is higher than that at the side of the pump 100.

In the active suspension apparatus for vehicle according to one embodiment of the present invention, the active suspension apparatus is realized using a motor and a cylinder-based pump, and the motor is only driven to operate the pump when required by the system, and thus only a required pressure can be generated at a proper time, and it is possible to increase an engine output and fuel efficiency.

Also, as the valve for controlling the movement of the fluid, the on/off valve is used, instead of the proportional valve, and thus it is possible to secure cost competitiveness and also achieve an overall simplification of the system.

Also, by providing the valve which can prevent the fluid from backflowing from the actuator side to the pump side even when the fluid pressure at the actuator side is higher than that at the pump side, the number of the valves in the active suspension system can be reduced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. An active suspension apparatus for a vehicle, comprising:
  a pump configured to control movement of a fluid;
  an actuator connected with a coil spring, which is connected with a wheel of the vehicle, and configured to receive the fluid from the pump and to compensate for a displacement of the coil spring;
  a fluid path configured to connect the pump with the actuator; and one or more valves configured to control a flow of the fluid in the fluid path;

wherein at least one of the valves is configured to prevent the fluid from moving from the actuator to the pump by a pressure of the fluid accommodated in the actuator when the actuator is controlled to receive the fluid from the pump, wherein the pump comprises a first chamber and a second chamber formed by dividing an inside of a cylinder in a longitudinal direction of the cylinder, and a first piston and a second piston are disposed at the first chamber and the second chamber, respectively, and wherein the first piston and the second piston are moved based on the driving of the motor, and the fluid accommodated in the first chamber and the second chamber is supplied to the actuator.

2. The apparatus of claim 1, wherein the actuator comprises first, second, third, and fourth actuators disposed at a left front wheel, a left rear wheel, a right front wheel, and a right rear wheel of the vehicle, respectively, and the pump is capable of simultaneously supplying the fluid to the first and second actuators or the third and fourth actuators based on driving of a motor.

3. The apparatus of claim 2, wherein the fluid path comprises a first fluid path between the pump and the first actuator, a second fluid path between the pump and the second actuator, a third fluid path between the pump and the third actuator, and a fourth fluid path between the pump and the fourth actuator.

4. The apparatus of claim 3, wherein the first fluid path comprises a 1-1 fluid path which is directly connected to the pump, a 1-2 fluid path of which one side is connected with the 1-1 fluid path and the other side is connected with the first actuator, and a 1-3 fluid path which is branched from a connection between the 1-1 fluid path and the 1-2 fluid path and connected with a reservoir, and the valves are disposed at the 1-2 fluid path and the 1-3 fluid path.

5. The apparatus of claim 3, wherein the second fluid path comprises a 2-1 fluid path which is directly connected to the pump, a 2-2 fluid path of which one side is connected with the 2-1 fluid path and the other side is connected with the second actuator, and a 2-3 fluid path which is branched from a connection between the 2-1 fluid path and the 2-2 fluid path and connected with a reservoir, and the valves are disposed at the 2-2 fluid path and the 2-3 fluid path.

6. The apparatus of claim 3, wherein the third fluid path comprises a 3-1 fluid path which is directly connected to the pump, a 3-2 fluid path of which one side is connected with the 3-1 fluid path and the other side is connected with the third actuator, and a 3-3 fluid path which is branched from a connection between the 3-1 fluid path and the 3-2 fluid path and connected with a reservoir, and the valves are disposed at the 3-2 fluid path and the 3-3 fluid path.

7. The apparatus of claim 3, wherein the fourth fluid path comprises a 4-1 fluid path which is directly connected to the pump, a 4-2 fluid path of which one side is connected with the 4-1 fluid path and the other side is connected with the fourth actuator, and a 4-3 fluid path which is branched from a connection part between the 4-1 fluid path and the 4-2 fluid path and connected with a reservoir, and the valves are disposed at the 4-2 fluid path and the 4-3 fluid path.

8. The apparatus of claim 1, wherein the valve comprises a sleeve;

an armature provided in the sleeve to be vertically movable;

a sheet holder coupled with a lower end of the sleeve and having a first connection part formed at a lower side thereof to be connected with a fluid path disposed at a side of the pump and a second connection part formed at a side surface thereof to be connected with the fluid path disposed at a side of the actuator; and an opening and closing member accommodated in the sheet holder to be vertically movable based on movement of the armature, and when the opening and closing member is moved upward, the first connection part and the second connection part are in fluid communication with each other.

9. The apparatus of claim 8, wherein the valve further comprises a first elastic member which applies a force in a downward direction of the opening and closing member.

10. An active suspension apparatus for a vehicle, comprising:

a pump configured to control movement of a fluid;

an actuator connected with a coil spring, which is connected with a wheel of the vehicle, and configured to receive the fluid from the pump and to compensate for a displacement of the coil spring;

a fluid path configured to connect the pump with the actuator; and one or more valves configured to control a flow of the fluid in the fluid path;

wherein at least one of the valves is configured to prevent the fluid from moving from the actuator to the pump by a pressure of the fluid accommodated in the actuator when the actuator is controlled to receive the fluid from the pump, wherein the valve comprises:

a sleeve;

an armature provided in the sleeve to be vertically movable;

a sheet holder coupled with a lower end of the sleeve and having a first connection part formed at a lower side thereof to be connected with a fluid path disposed at a side of the pump and a second connection part formed at a side surface thereof to be connected with the fluid path disposed at a side of the actuator; and an opening and closing member accommodated in the sheet holder to be vertically movable based on movement of the armature, and when the opening and closing member is moved upward, the first connection part and the second connection part are in fluid communication with each other.

11. The apparatus of claim 10, wherein the valve further comprises a first elastic member which applies a force in a downward direction of the opening and closing member.

12. The apparatus of claim 10, wherein the actuator comprises first, second, third, and fourth actuators disposed at a left front wheel, a left rear wheel, a right front wheel, and a right rear wheel of the vehicle, respectively, and the pump is capable of simultaneously supplying the fluid to the first and second actuators or the third and fourth actuators based on driving of a motor.

13. The apparatus of claim 12, wherein the fluid path comprises a first fluid path between the pump and the first actuator, a second fluid path between the pump and the second actuator, a third fluid path between the pump and the third actuator, and a fourth fluid path between the pump and the fourth actuator.

14. The apparatus of claim 13, wherein the first fluid path comprises a 1-1 fluid path which is directly connected to the pump, a 1-2 fluid path of which one side is connected with the 1-1 fluid path and the other side is connected with the first actuator, and a 1-3 fluid path which is branched from a connection between the 1-1 fluid path and the 1-2 fluid path and connected with a reservoir, and the valves are disposed at the 1-2 fluid path and the 1-3 fluid path.

15. The apparatus of claim 13, wherein the second fluid path comprises a 2-1 fluid path which is directly connected to the pump, a 2-2 fluid path of which one side is connected with the 2-1 fluid path and the other side is connected with the second actuator, and a 2-3 fluid path which is branched from a connection between the 2-1 fluid path and the 2-2 fluid path and connected with a reservoir, and the valves are disposed at the 2-2 fluid path and the 2-3 fluid path.

16. The apparatus of claim 13, wherein the third fluid path comprises a 3-1 fluid path which is directly connected to the pump, a 3-2 fluid path of which one side is connected with the 3-1 fluid path and the other side is connected with the third actuator, and a 3-3 fluid path which is branched from a connection between the 3-1 fluid path and the 3-2 fluid path and connected with a reservoir, and the valves are disposed at the 3-2 fluid path and the 3-3 fluid path.

17. The apparatus of claim 13, wherein the fourth fluid path comprises a 4-1 fluid path which is directly connected to the pump, a 4-2 fluid path of which one side is connected with the 4-1 fluid path and the other side is connected with the fourth actuator, and a 4-3 fluid path which is branched from a connection part between the 4-1 fluid path and the 4-2 fluid path and connected with a reservoir, and the valves are disposed at the 4-2 fluid path and the 4-3 fluid path.

18. The apparatus of claim 10, wherein the pump comprises a first chamber and a second chamber formed by dividing an inside of a cylinder in a longitudinal direction of the cylinder, and a first piston and a second piston are disposed at the first chamber and the second chamber, respectively, and the first piston and the second piston are moved based on the driving of the motor, and thus the fluid accommodated in the first chamber and the second chamber is supplied to the actuator.

* * * * *